(12) United States Patent
Fuchs et al.

(10) Patent No.: US 7,658,271 B2
(45) Date of Patent: Feb. 9, 2010

(54) CONVEYOR

(75) Inventors: Manfred Fuchs, Kapfenberg (AT);
Simon Curry, Brenthurst (ZA)

(73) Assignee: Sandvik Mining and Construction G.m.b.H., Zeltweg (AT)

( * ) Notice: Subject to any disclaimer, the term of this patent is extended or adjusted under 35 U.S.C. 154(b) by 359 days.

(21) Appl. No.: 11/636,132

(22) Filed: Dec. 8, 2006

(65) Prior Publication Data
US 2008/0067033 A1   Mar. 20, 2008

(30) Foreign Application Priority Data
Sep. 14, 2006 (AT) ............................. A 1537/2006

(51) Int. Cl.
*B65G 41/00* (2006.01)
(52) U.S. Cl. .................. 198/311; 198/312; 198/313; 198/595; 198/812; 414/503; 414/505
(58) Field of Classification Search ................ 198/303, 198/311–315, 317, 595, 812; 414/503–505, 414/523, 528
See application file for complete search history.

(56) References Cited

U.S. PATENT DOCUMENTS

| | | | | |
|---|---|---|---|---|
| 3,339,708 A * | 9/1967 | Luksich | .................. | 198/812 |
| 4,591,432 A * | 5/1986 | Hartl | .................. | 209/247 |
| 4,890,720 A * | 1/1990 | Brais | .................. | 198/592 |
| 4,986,412 A * | 1/1991 | Brais | .................. | 198/592 |
| 5,718,556 A * | 2/1998 | Forsyth | .................. | 414/503 |
| 5,938,004 A * | 8/1999 | Roberts et al. | .................. | 198/812 |
| 5,979,642 A * | 11/1999 | Hall et al. | .................. | 198/812 |
| 6,095,320 A * | 8/2000 | DeMong et al. | .................. | 198/812 |
| 6,283,697 B1 * | 9/2001 | Pierce et al. | .................. | 414/504 |
| 6,464,426 B1 * | 10/2002 | Girouard | .................. | 404/101 |
| 6,471,031 B1 * | 10/2002 | Duncalf | .................. | 198/311 |
| 6,782,993 B2 * | 8/2004 | Bernard et al. | .................. | 198/585 |
| 7,287,637 B2 * | 10/2007 | Campbell et al. | .................. | 198/550.2 |

* cited by examiner

*Primary Examiner*—Douglas A Hess
(74) *Attorney, Agent, or Firm*—Chapman and Cutler LLP

(57) ABSTRACT

In a movable conveyor belt storage installation including a belt storage means (4), conveyor belt support structures (29) following the belt storage means (4), and a movable takeover car (7) including a deflection means (43) for the conveyor belt and a takeup chute (8) for taking over excavated material, the belt storage means (4) is comprised of at least two segments (13, 20, 22, 26) which are connected with one another so as to be pivotable about an axis extending transversely to the belt running direction and passing through the plane of the floor (31), wherein at least a portion of the support structures (29) are capable of being carried along in or on the takeover car (7).

20 Claims, 14 Drawing Sheets

CONVEYOR

The invention relates to a movable conveyor belt storage installation including a belt storage means, conveyor belt support structures following the belt storage means, and a movable takeover car including a deflection means for the conveyor belt and a takeup chute for taking over excavated material, a belt storage means suitable for such an installation as well as a takeover car to be used in a particularly preferred manner with such a conveyor belt storage installation.

BACKGROUND OF THE INVENTION

U.S. Pat. No. 2,925,901 discloses a continuous conveyor installation comprised of a belt storage means, consecutively arranged carrying structures and a takeover car referred to as "hopper car". The takeover car in that case takes over the material cut or excavated by a heading or mining machine, utilizing the delivery conveyor directly connected with the heading or mining machine for lifting the material to a level where its discharge onto the takeup chute is feasible. However, particularly with relatively large-structured belt storage means, such an installation cannot be moved as desired. It is rather necessary, as a rule, to completely disassemble the belt conveyor and set it up again on the new location of use, for a new break-in and a new track to be excavated. This involves high dismounting and mounting expenditures and relatively large time losses.

Conveyor belt storage installations including a storage unit with consecutively arranged carrying structures, inter alia, are described in GB 1391612. A similar installation comprising a conveyor belt storage means is to be taken from GB 1150696, in which filling is done using vehicles that are movable in the track. In particular, when working relatively low seams, the spatial limitation resulting therefrom places high demands on the construction of such a movable conveyor belt storage installation. Considering its structural dimensions, a belt storage means would, as a rule, not be introducible into a substantially lower-height seam to be worked, so that relatively large distances would have to be traveled with the stored conveyor belt in order to enable the haulage of excavated material. The accordingly increased conveyor belt demand in the known structures calls for further enlargements of the structural dimensions.

Appropriate supports for the conveyor belt must be provided between the belt storage means and the takeover car, which itself comprises a deflection pulley for the conveyor belt pulled from the belt storage means. Consequently, also the support structures will have to be introduced into the seam to be worked. To this end, DE-A1 38 37 986 proposes a carrying structure for roller holders for upper and lower belt rollers, in which the carrying beams are telescopically displaceable within one another in groups. Such additional devices can, for instance, also be taken from U.S. Pat. No. 6,095,320, where a storage system for carrying structures is described, in which the carrying structures are arranged to be displaceable within one another by their longitudinal struts. In order to ensure the required stability, the longitudinal struts are rigidly connected with a structural beam.

From U.S. Pat. No. 4,245,738, a heading machine has finally become known, to which an extractable belt conveyor device is connected. There, the conveyor belt carrying structures required as a support can be taken from a storage means and are provided with bottom plates to ensure the necessary stability.

None of the known belt storage means, takeover cars and supporting means is size-reducible by any extent such that an accordingly largely automated use will not be readily feasible in low seams. Nor are the known devices sufficiently flexible that the disassembly and reassembly of the belt storage means could be obviated at a change from one track to another. Finally, the known takeover cars are not particularly suited for use in particularly low tracks and are, above all, limited in their mobility when traveling on roads with ditches and crowns.

SUMMARY OF THE INVENTION

The invention aims to provide a movable conveyor belt storage installation and elements suitable therefor, which enable without difficulty its use in particularly low tracks and also the passage of ditches and crowns in the driving operation. The invention further aims to provide a movable conveyor belt storage installation of the initially defined kind, which enables a change from one track to another without requiring the disassembly and reassembly of the conveyor and, in particular, the belt storage means.

To solve this object, the movable conveyor belt storage installation according to the invention, of the initially defined kind essentially consist in that the belt storage means is comprised of at least two segments which are connected with one another so as to be pivotable about an axis extending transversely to the belt running direction and passing through the plane of the floor, and that at least a portion of the support structures are capable of being carried along in or on the takeover car. Due to the fact that the belt storage means is comprised of a plurality of segments which themselves are, in turn, articulately connected with one another, and connected with one another so as to be pivotable about an axis extending transversely to the belt running direction and passing through the plane of the floor, it has become feasible to ensure the movability of the overall installation without disassembly of the belt storage means even in narrow curves. By at least a portion of the support structures being capable of being carried along in or on the takeover car, the supports required for an extension of the conveyor belt will always be taken along as far as close to the mine face so as to enable the largely continuous reconstruction of the support in line with the excavation progress without requiring long transport distances for the individual support structures.

In this respect, the configuration is advantageously devised such that a portion of the support structures are mounted so as to be extractable along with the belt storage means, and the major portion of the support structures are mounted in the takeover car so as to be liftable and lowerable in the height direction.

A belt storage means that is particularly suitable for the movable conveyor belt storage installation according to the invention is further developed according to the invention in that the belt storage means comprises a plurality of segments, that at least two segments are provided with crawler mechanisms, that the segments comprise frame beams extending transversely to the belt running direction, and that releasable locking members are provided for the pivotable connection of frame beams. At least two of the individual segments are, thus, to be provided with crawler mechanisms in order to ensure the appropriate maneuverability, said pivotable connection being directly ensured by appropriately designed, releasable locking members which are, at the same time, able to form the articulation axes for such pivotability. In this context, the configuration is advantageously devised such that the releasable locking members are comprised of pins or rods which are displaceable in the axial direction in a manner as to axially immerse into, or emerge from, bearing eyes, with the axes of the pins or rods each constituting the pivot axes. One of the segments is each provided with the respective bearing eyes, whereas the neighboring segment carries the releasable locking members capable of immersing into the bearing eyes.

In order to be able to reliably furnish particularly long tracks with conveyor belt, the configuration according to the invention is advantageously devised such that at least one segment comprises bearings for mounting support rollers carrying additional conveyor belt. Additional conveyor belt is, thus, already integrally carried along with the belt storage means on separate reels and, hence, no additional device needs to be employed to extend the conveyor belt. The formation of the belt storage means of individual segments allows for the assignment of such additional functions to individual segments while, nevertheless, safeguarding the flexibility required for the passage of any tracks.

In accordance with the invention, the configuration is advantageously devised such that the individual segments, in a box-shaped profile, comprise traveling rails for cars having displaceable deflection pulleys for the stored belt, which enter into mutual alignment upon locking of the locking members. The individual segments must be interlocked in the respective operating position, and it is only in this position that conveyor belt can be pulled from the storage. In this position, it must, thus, also be ensured that the rollers required for tensioning the conveyor belt and pulling off the desired length of conveyor belt are movable in the longitudinal direction of the belt storage means together with their respective cars carrying the roller bearings. The rollers themselves with different diameters are each arranged in movable structures in a conventional manner, with the belt being guided around the individual rollers in the manner of a hoist as in correspondence with the known prior art.

The desired all-terrain-suitability and flexibility with narrow curve radii will advantageously be achieved in that at least three articulately connected segments are each equipped with at least one crawler mechanism. The articulatability in any direction will be ensured in a particularly simple manner in that the articulately connected segments each comprise two independently operable locking members arranged outside the longitudinal center of the belt storage means or the respective segment, and that the segments are each connected with one another so as to be pivotable about the locked axis, with the respectively locked curve-inner axis ensuring the respective pivotability. Locking, or the release of locking, can be effected in a particularly simple manner in that the locking members are formed by hydraulically actuatable pins, whereby such a configuration will also ensure that accordingly high forces will be safely absorbed by the locking members.

The takeover car that is particularly suitable for use in the movable conveyor belt storage installation according to the invention comprises, like other known cars, a frame and a chassis connected with the frame, particularly a crawler mechanism, and a deflection pulley for a conveyor belt running below a takeup chute, and additionally, according to the invention, further elements and is preferably further developed such that the frame is configured as a portal frame to articulately support at least one subframe for holding carrying structures and/or a bearing of the deflection pulley and/or the takeup chute. The configuration of the frame as a portal frame allows for the suspension of the subframe in a suitable manner and, in particular, its fixation in an accordingly resilient fashion in the manner of a three-point bearing so as to enable self-adjustment of the conveyor belt via the deflection pulley. At the same time, such a suspension allows for an enhanced mobility in ditches and an easier passage of crowns in the driving operation, since the use of a subframe enables the achievement of an appropriate height adjustability relative to the portal frame in order to avoid collisions with the floor. In this respect, the configuration is advantageously devised such that the subframe is suspendingly mounted on the portal frame, wherein the subframe is preferably connected with the portal frame so as to be adjustable in the height direction.

As already mentioned, it is feasible to provide a particularly advantageous suspension with the appropriate freedom of movement in the manner of a three-point suspension, wherein a particularly preferred construction consists in that the subframe is connected with the portal frame via at least two hydraulic cylinder piston units and at least one further articulation having at least two degrees of freedom of movement.

For the safe mounting of the support structures entrained by the takeover car as far as close to the mine face, the configuration is advantageously devised such that the subframe comprises beams extending in the longitudinal direction of the takeover car for accommodating support structures, wherein a deposit for connection rods for the support structures is advantageously provided in addition, which connection rods are connectable with two locking sites of the support structures via at least two locking members, in particular screw bolts, which are offset in the longitudinal direction over the connection rods. The provision of at least two locking sites arranged to be offset in the longitudinal direction allows for the interconnection of the individual supports with a view to securing them against tilting or pivoting, so that space-demanding bottom plates can be obviated and an increased number of supports can be readily carried along by the takeover car. The configuration in this respect is advantageously devised such that the support structures are mounted on the subframe via rollers so as to be displaceable in the longitudinal or conveying direction.

BRIEF DESCRIPTION OF THE DRAWINGS

In the following, the invention will be explained in more detail by way of exemplary embodiments schematically illustrated in the drawing. Therein.

DETAILED DESCRIPTION OF THE INVENTION

Figure 1:
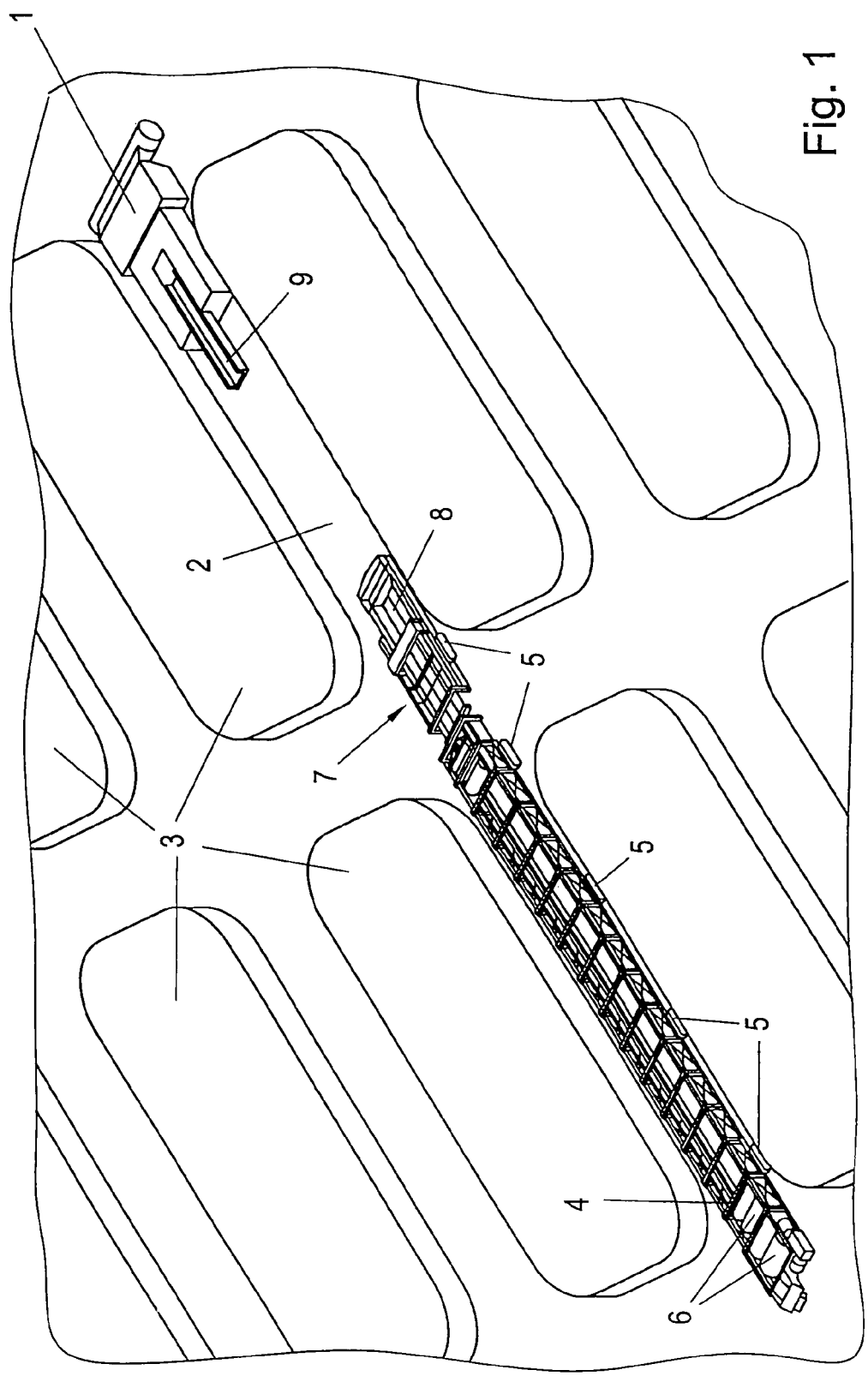
FIG. 1 is a perspective top view on a track with the heading machine in a position in which the excavation of material is to be started.

FIG. 1 depicts a heading machine denoted by 1, which, for obtaining material to be excavated, is illustrated in a position in which break-in cutting takes place. In FIG. 1, the driven track is, furthermore, denoted by 2, with the pillars left between already driven, neighboring track sections being denoted by 3.

Within the track 2, a belt storage means 4 comprising a plurality of crawler mechanisms 5 is to be seen. The crawler mechanisms are each associated to individual segments of the belt storage means 4, wherein drums 6 containing additional conveyor belt in the coiled state are visible on the rear end.

A takeover car 7 comprising a takeup chute 8 is illustrated adjacent to the front end of the belt storage means 4. The delivery conveyor, which is schematically indicated by 9 on the rear end of the heading or mining machine 1, in operation is lifted to such an extent that the material excavated by the heading or mining machine 1 can be thrown into the chute 8 via the conveyor 9. The material will then reach the conveyor belt pulled from the belt storage means 4.

Figure 2:
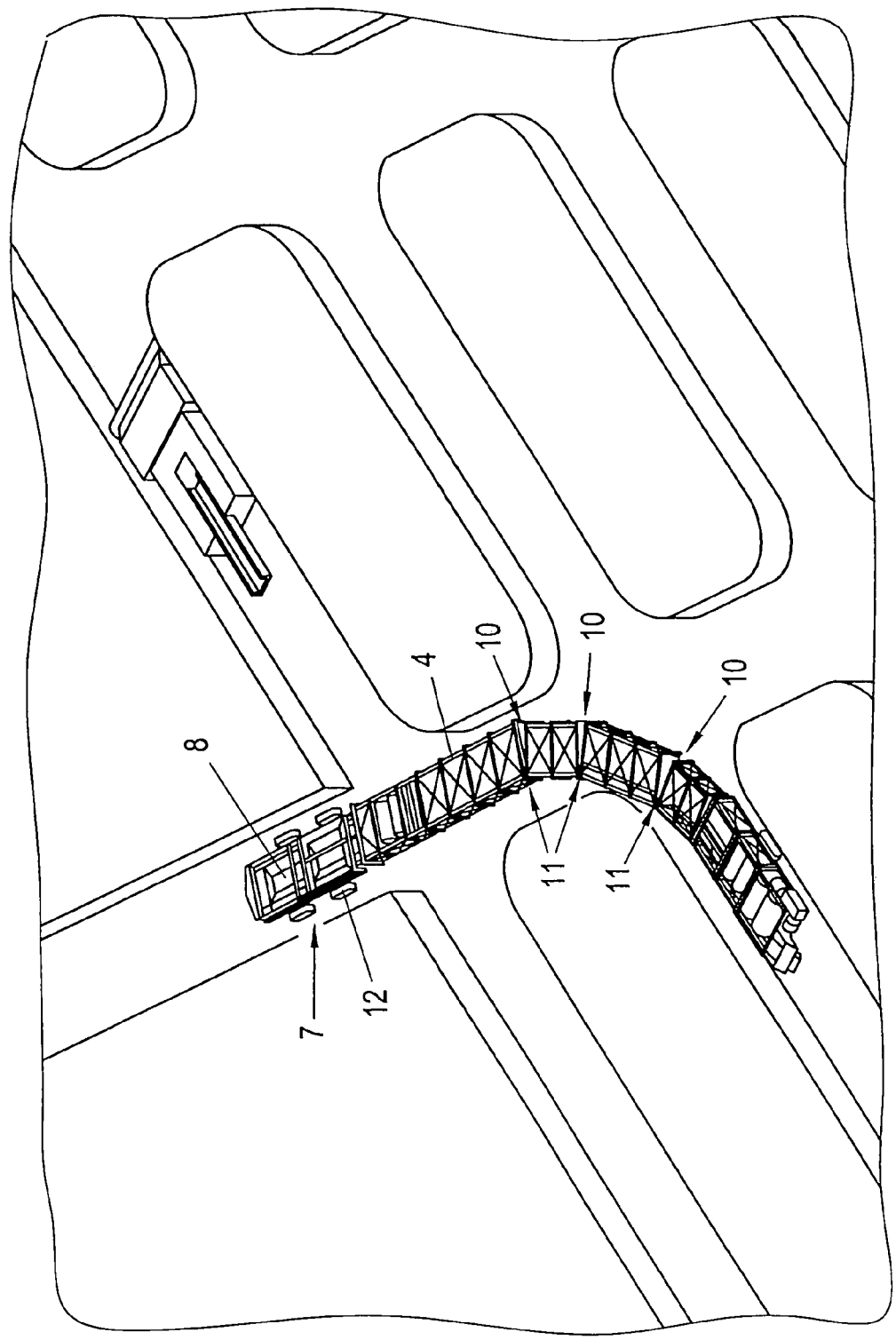
FIG. 2 depicts the movable conveyor belt storage installation moving within the track while following small curve radii.

The illustration of FIG. 2 schematically indicates the movability of the conveyor belt storage installation. In the respective traveling position, no discharge of material and no haulage will, of course, take place, since the belt is retracted in the belt storage means 4 and the most compact length is, in the main, provided. However, in order to guarantee the required curve-going ability, the locking members have been released on respective sites schematically indicated at 10, while no unlocking has been effected on the corresponding sites 11 each located opposite the longitudinal center so as to each form an articulation axis that guarantees the curve-going ability. The crawler mechanism of the takeover car 7 is denoted by 12.

Figure 3:
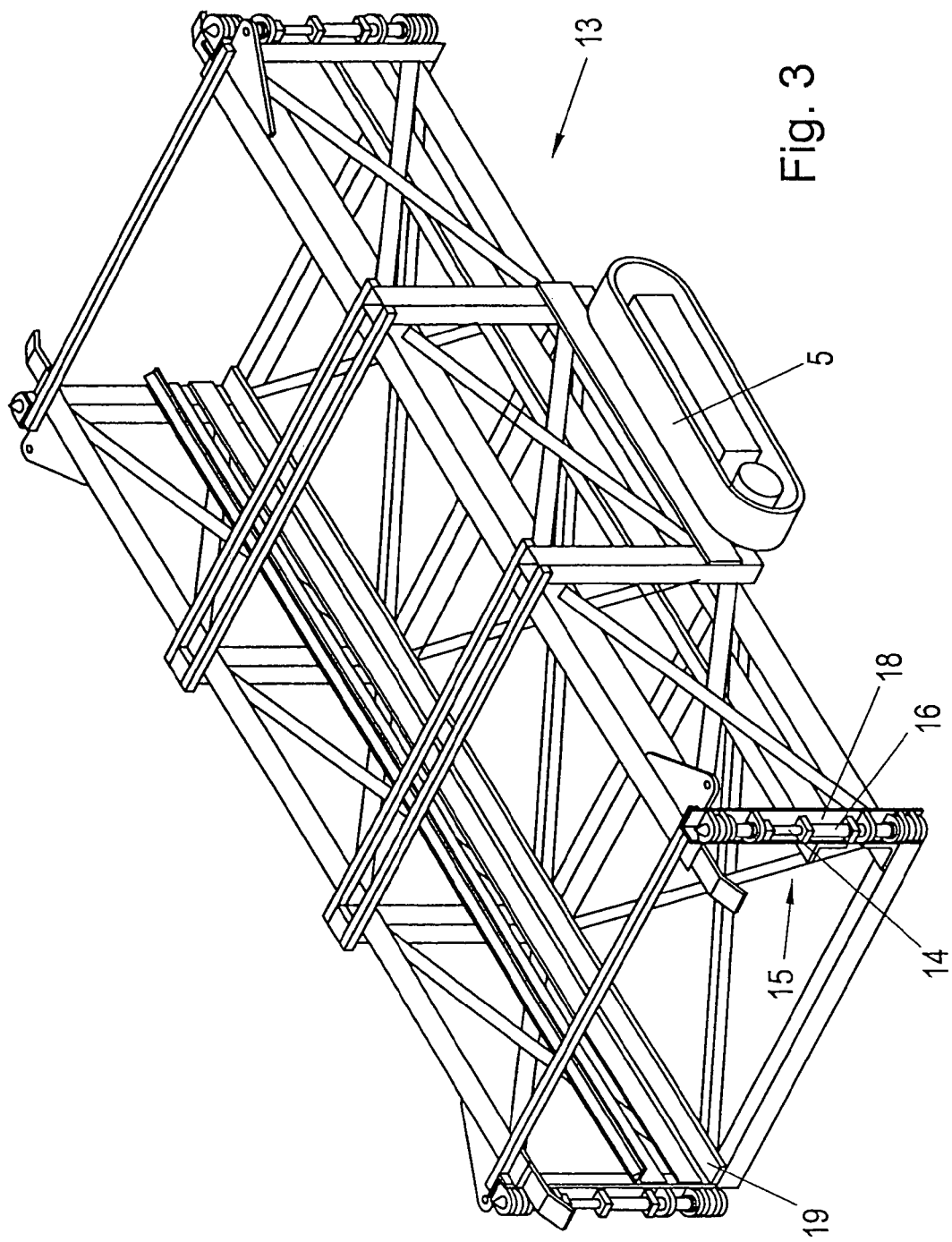
FIG. 3 is a perspective view of a segment equipped with a crawler mechanism.
Figure 4:
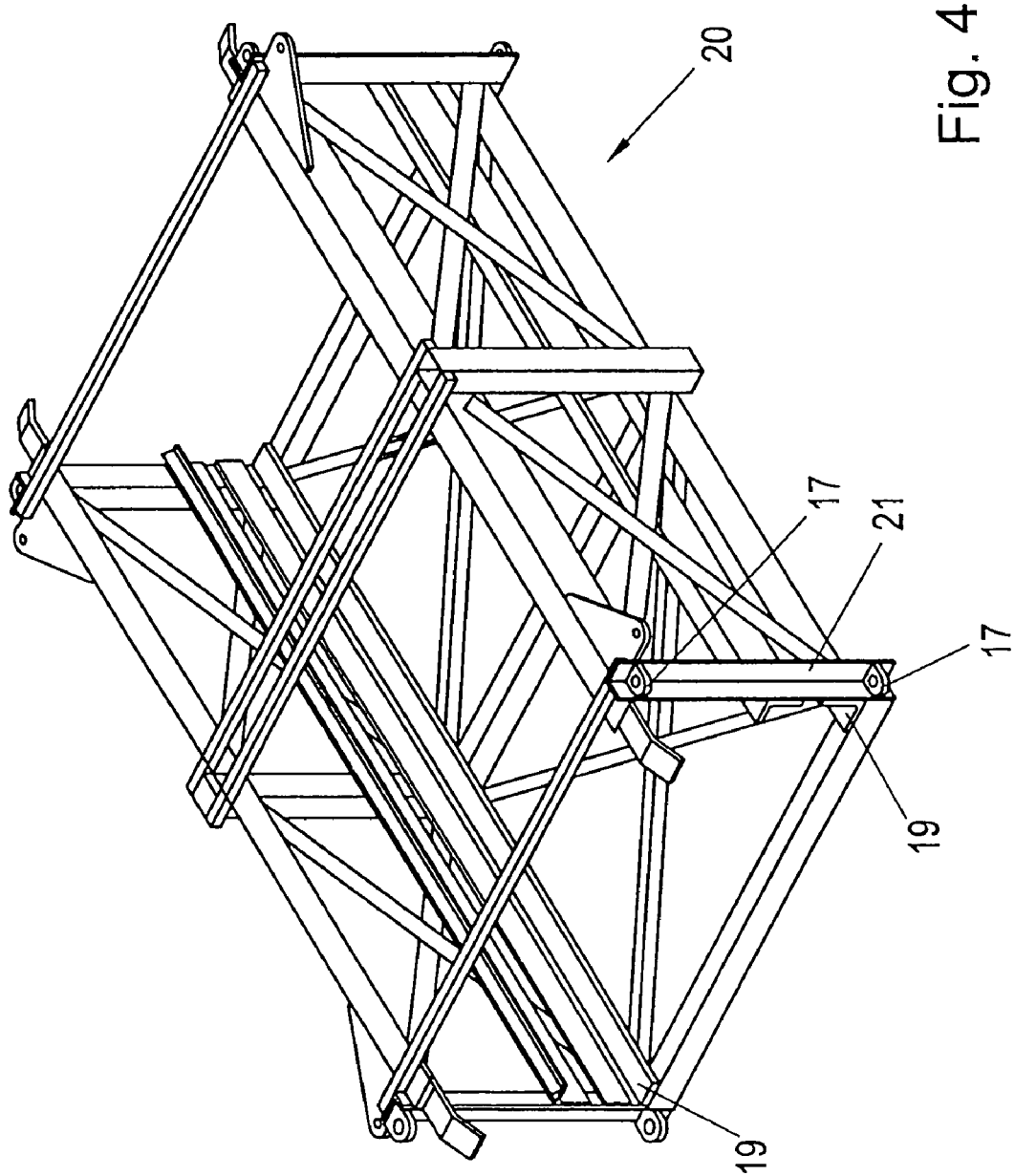
FIG. 4 illustrates a segment including bearing eyes for the locking members of neighboring segments which constitute the articulation axes.

From the depiction according to FIG. 3, a segment 13 of the belt storage means 4 is apparent, which is equipped with locking members 15 formed by pins 14. These pins 14 of the locking members 15 are displaceable in the axial direction by the aid of cylinder piston units 16 and can, thus, be inserted into corresponding bearing eyes 17 as are apparent from FIG. 4, while forming an articulation axis. The segment 13 additionally comprises a crawler mechanism 5. The upwardly extending frame beams are denoted by 18 and carry the respective locking members. The box-shaped frame construction also contains running rails 19 for deflection pulleys of a conveyor-belt-carrying car, which are aligned with the respective running rails 19 of neighboring segments 20 in the respectively locked position. Such a neighboring segment 20 is represented in FIG. 4, where the upwardly extending bearing-eye-carrying beams are denoted by 21. Sufficient free space for the guidance of the stored conveyor belt is in this case provided above the rails 19 by the box-shaped structure.

Figure 5:
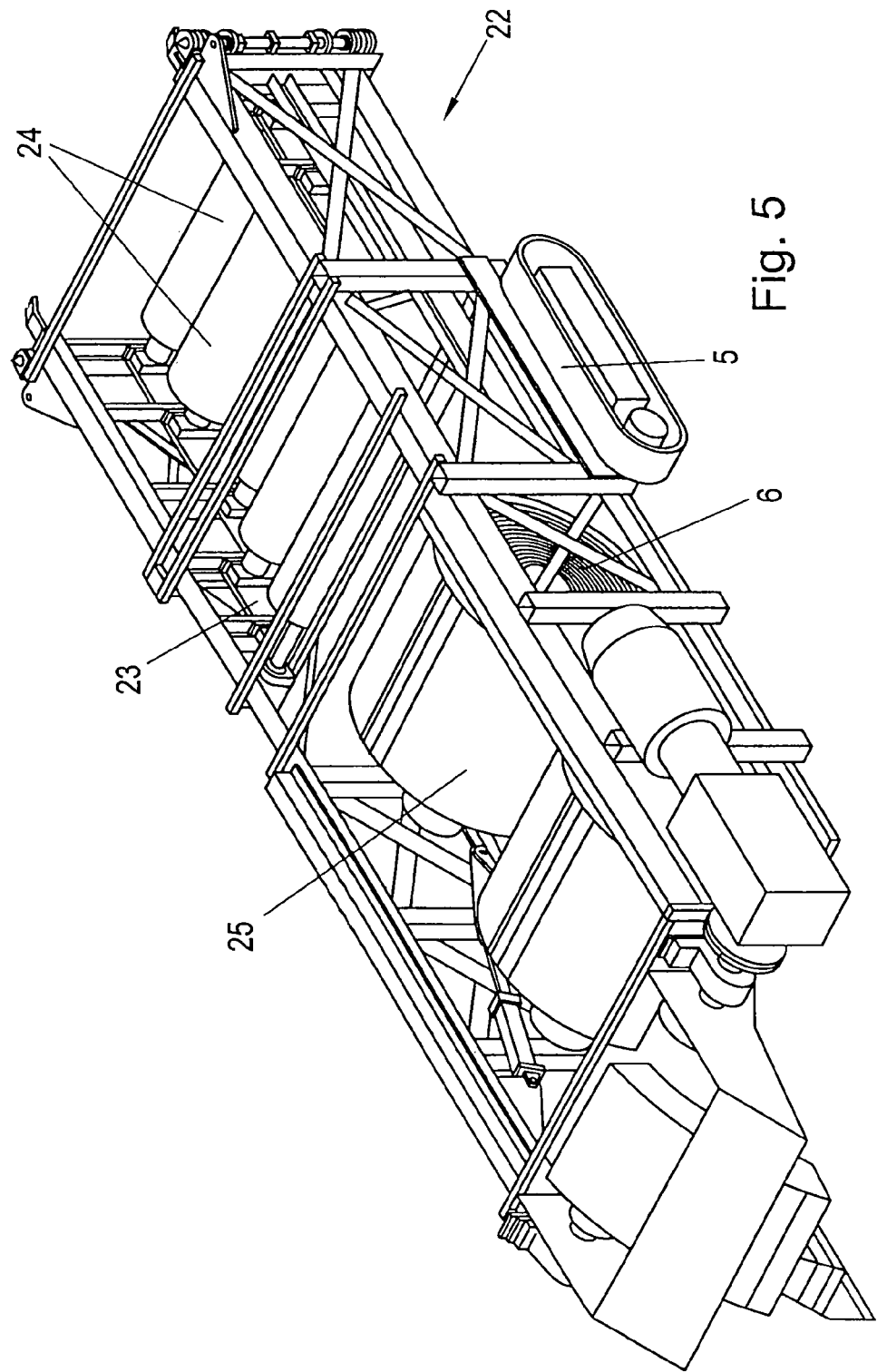
FIG. 5 depicts a further, modified segment equipped with a crawler mechanism and including reels of additional conveyor belt.

FIG. 5 depicts a further, terminal belt storage segment 22, which again comprises a crawler mechanism 5 in addition to deflection rolls 24 for the stored belt, which are mounted in a car 23. The drums 6 again carry reels with additional conveyor belt, which are schematically indicated at 25 and, if required, can be connected with the belt already provided in the storage in order to extend the stored belt.

Figure 6:
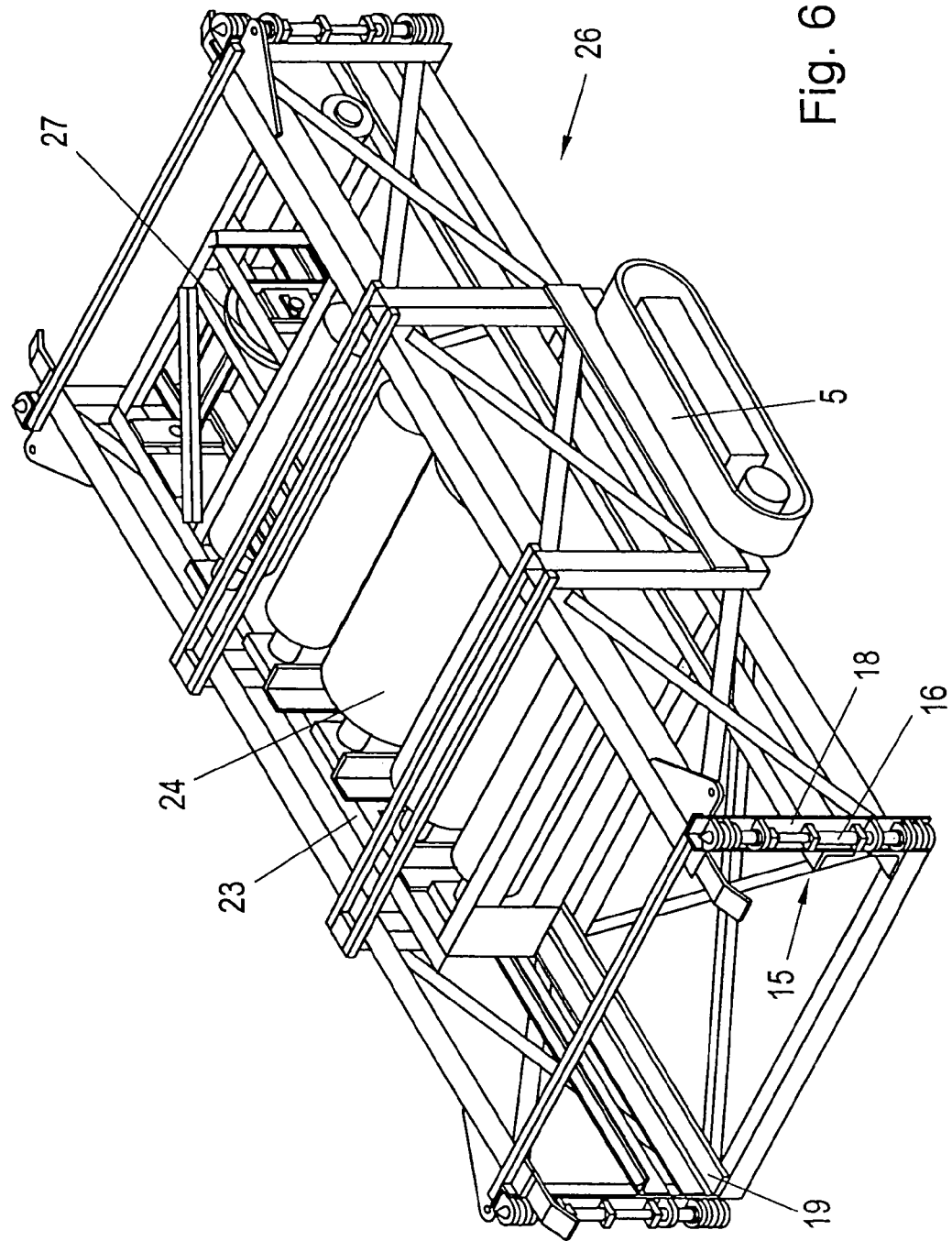
FIG. 6 depicts a segment facing the pulled off conveyor belt and, hence, the mine face, with a tensioning car for the stored conveyor belt.

The illustration according to FIG. 6 depicts a further segment 26 again comprising a crawler mechanism 5. From this, the second car 23 which is movable on running rails 19 is apparent, again equipped with deflection pulleys 24 for the stored conveyor belt. In order to maintain the desired belt tension as far as to the takeover car 7, a rope (not illustrated) guided about a deflection pulley 27 is provided, which keeps the car 23 under the tension of the conveyor belt (not illustrated), under tensile stress. The segment 26 again carries locking members 15 operated by hydraulic cylinder piston units 16.

Figure 7:
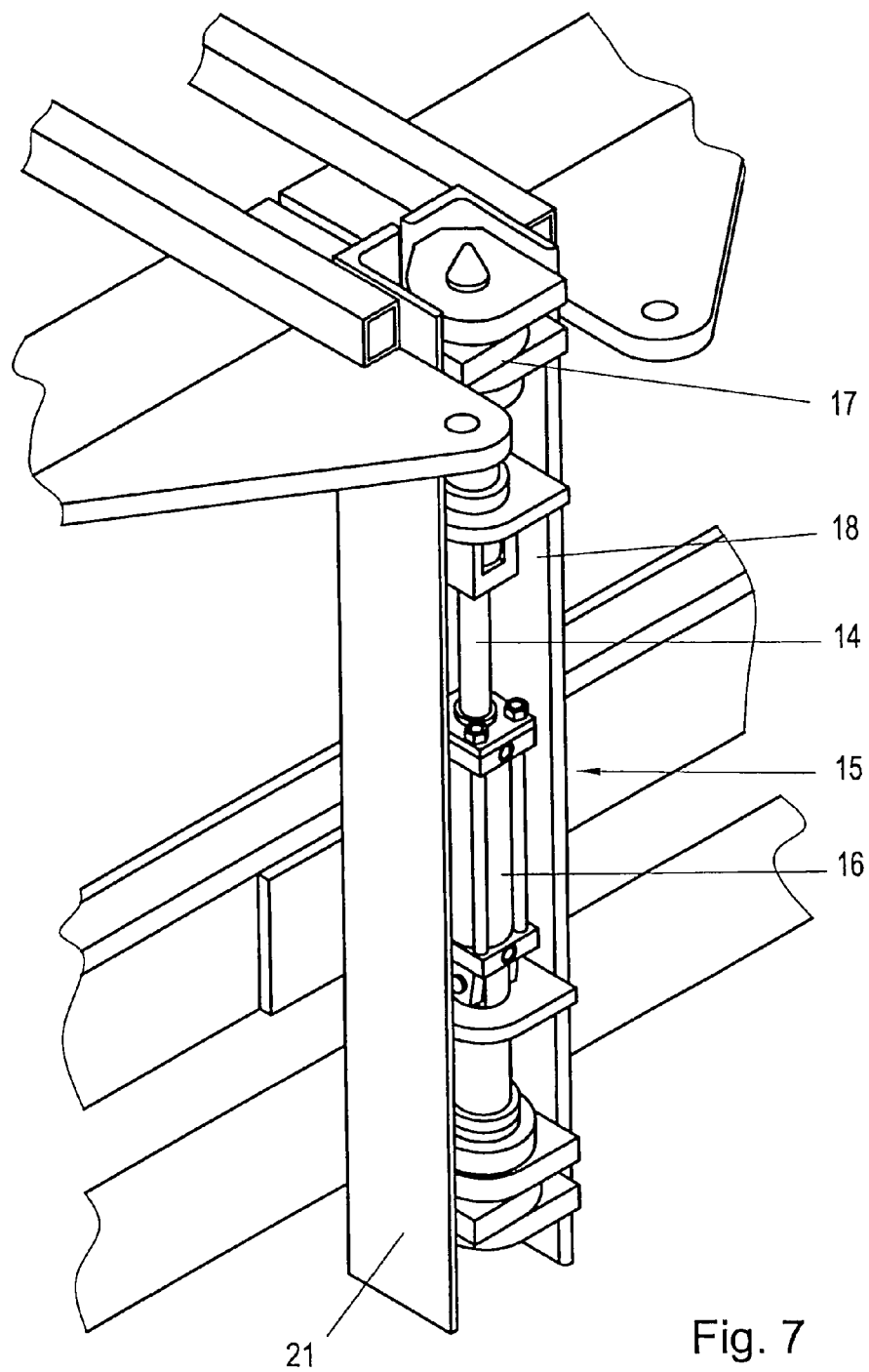
FIG. 7 shows a detail of the locking members used to connect neighboring segments.

In the depiction according to FIG. 7, the locking members 15 formed by rods are now illustrated in their engaged positions. The pins 14 in this case pass through the bearing eyes 17 of neighboring segments, thus providing the respective lock, or desired articulation axis, in their end regions. The hydraulic cylinder piston unit provided to actuate the pin 14 is again denoted by 16.

Figure 8:
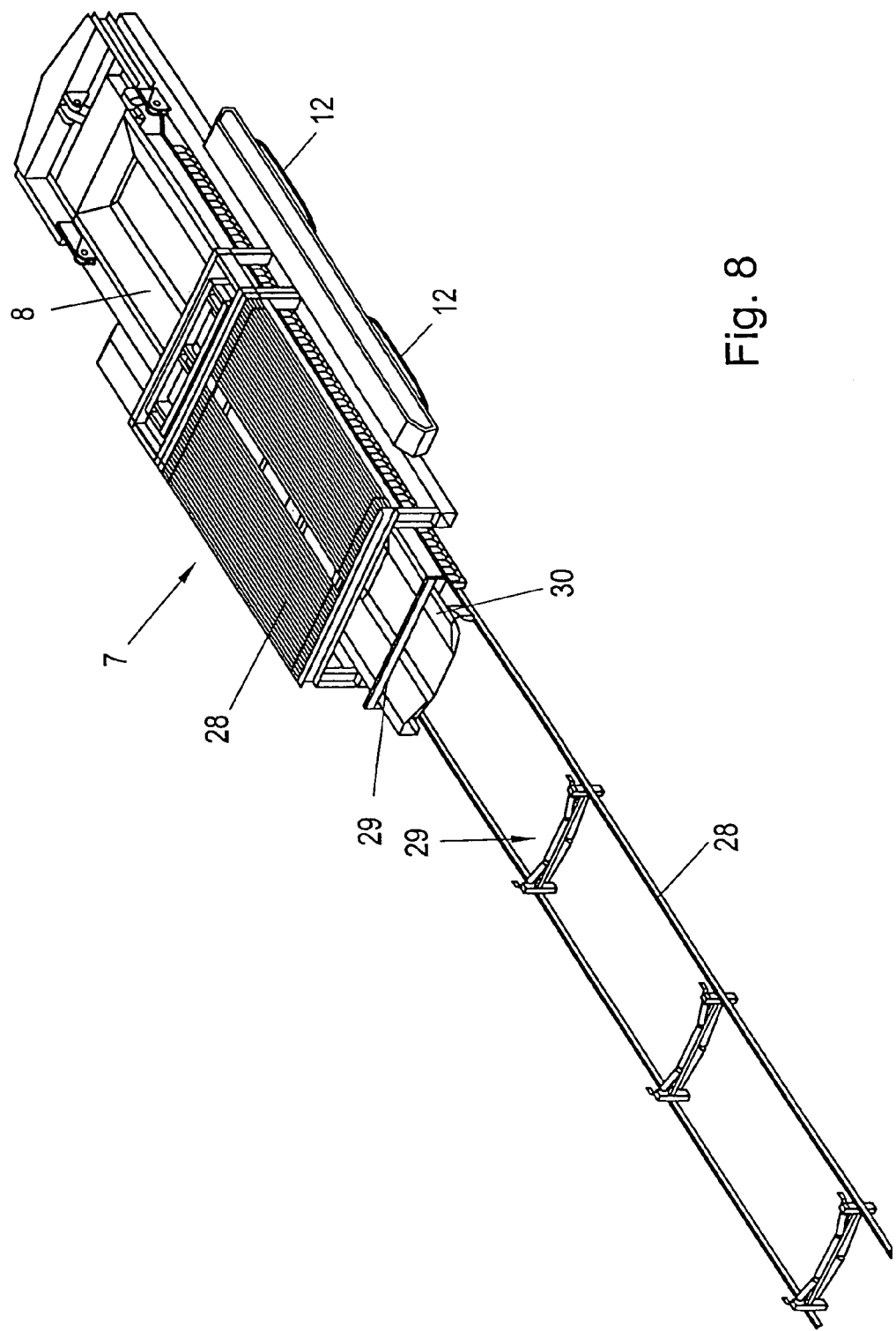
FIG. 8 is a perspective view of the takeover car as well as some support structures pulled from the takeover car and already fixed in the track.

In FIG. 8, the takeover car 7 is illustrated on an enlarged scale, with the takeup chute being again denoted by 8. On the upper side of the takeover car, connection rods 28 are kept in store for subsequent use to connect neighboring support structures 29. The support structures 29 are stored on frame beams 30 of the takeover car. The takeover car 7 comprises a crawler mechanism 12, which has already been apparent from FIG. 1.

Figure 9:
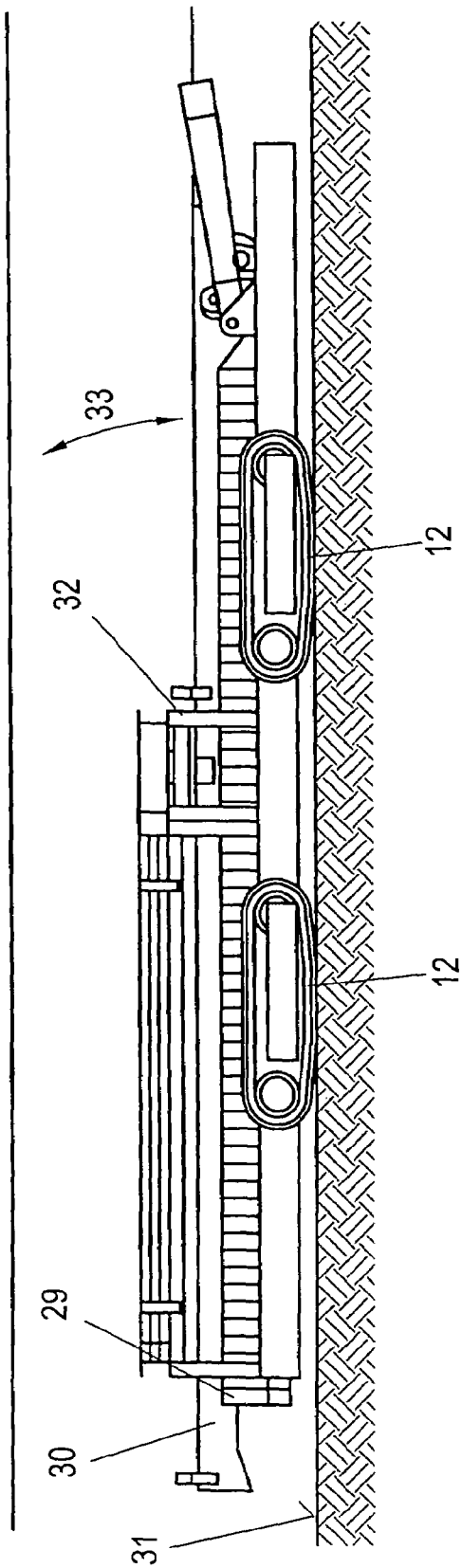
FIG. 9 is a schematic side view of the takeover car according to FIG. 8 with support structures lifted from the floor.
Figure 10:
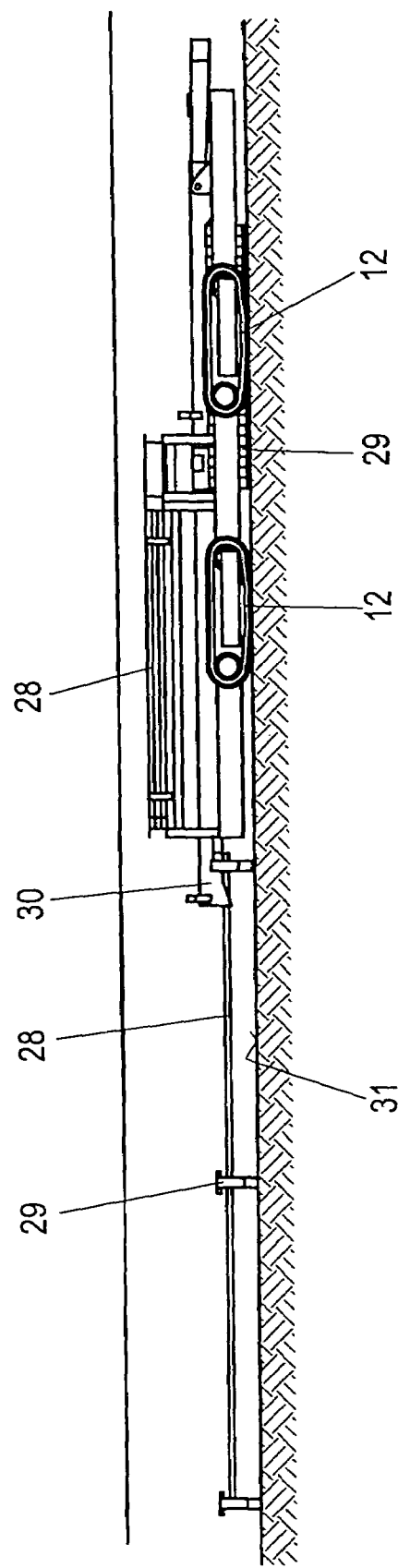
FIG. 10 is an illustration analogous to FIG. 9 with accordingly lowered or deposited support structures.

FIG. 9 is a schematic side view illustrating that the support structures 29 are lifted off the floor plane 31 with the frame beams 30 being in a respectively lifted position. To this end, the frame beams 30 form part of a subframe arranged in a portal frame 32 so as to be liftable and lowerable in the sense of double arrow 33. The respectively lowered position is schematically apparent from FIG. 10.

Figure 11:
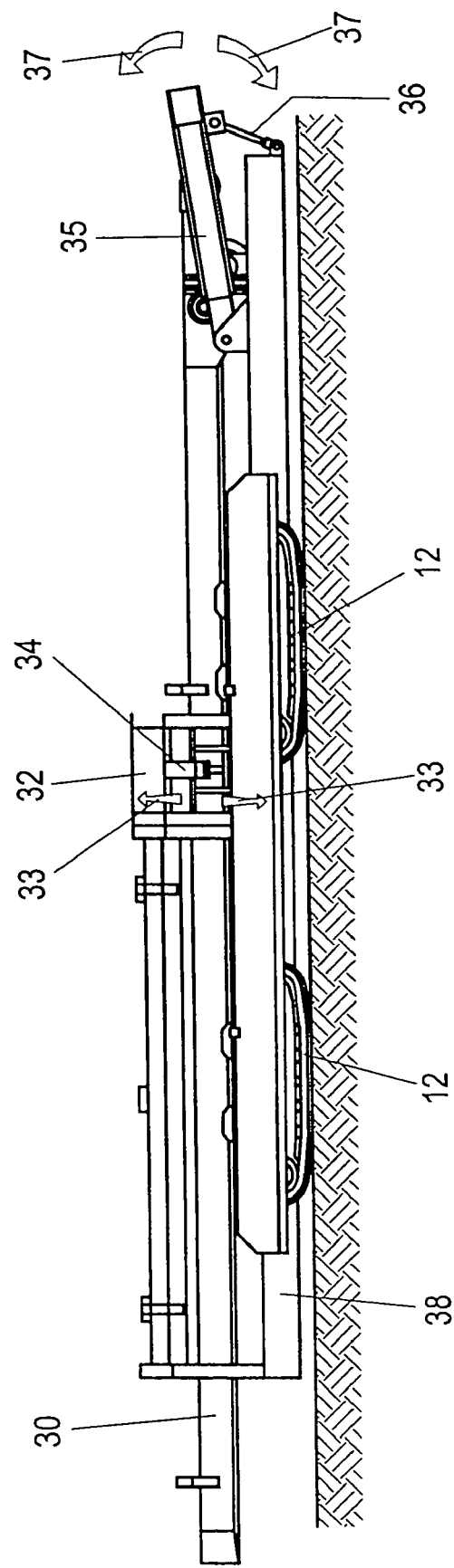
FIG. 11 is a view corresponding to FIGS. 9 and 10, depicting details of the actuators provided for lifting and lowering the frames.

FIG. 11 schematically illustrates the height adjustability of the frame beams 30, or subframe comprised of the frame beams 30. Height adjustability is again feasible in the sense of double arrow 33, to which end hydraulic cylinder piston units 34 are provided, by means of which the frame beams 30 are mounted so as to be adjustable in the height direction relative to a portal frame 32. Furthermore, a pivotable frame part 35 is provided, which is pivotable via a hydraulic cylinder piston unit 36 in the sense of double arrow 37 and, in this manner, assists the respective lifting of the frame beams 30. The crawler mechanism 12 in this case is fixed to a base frame 38, the relative adjustability of the individual frames relative to one another being more clearly apparent from FIGS. 12 and 13 below.

Figure 12:
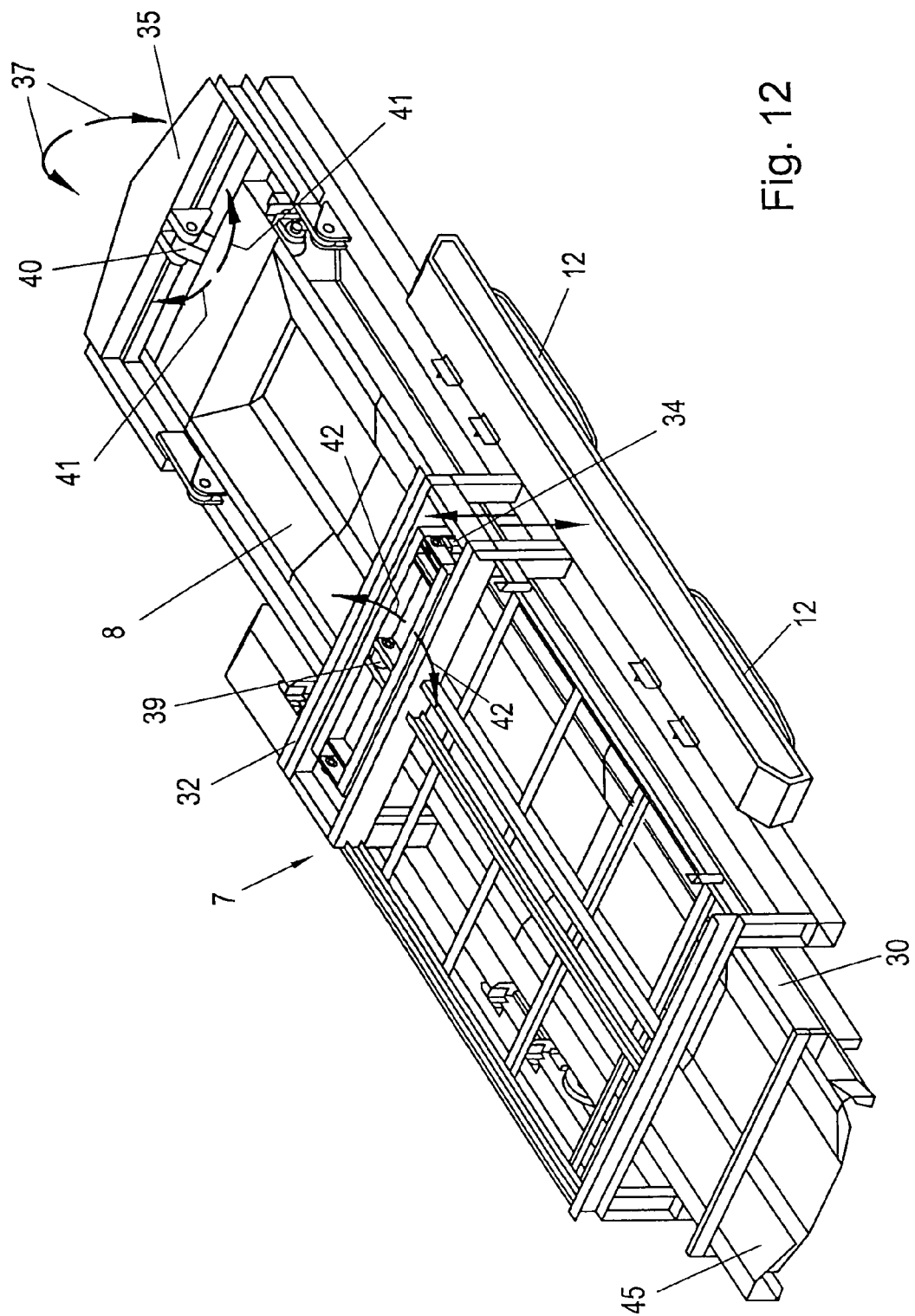
FIG. 12 is an enlarged, perspective top view on the takeover car and the takeup chute.

In FIG. 12, the crawler mechanism is again denoted by 12, wherein, in addition to an articulation 39 having at least two degrees of freedom, hydraulic cylinder piston units 34 are each provided laterally on the portal frame 32 to enable an adjustment in the height direction, of the subframe comprising the frame beams 30 relative to the portal frame 32. Moreover, the front deflection pulley 43 for the conveyor belt is also mounted between the frame beams 30 (not illustrated), said front deflection pulley in the region of the pivotable frame part being again connected with the subframe by an articulation 40 having at least two degrees of freedom so as to enable the self-centering of the conveyor belt. The degrees of freedom respectively provided in addition to those resulting from the articulation axes of the articulations 39 and 40, respectively, are schematically indicated by arrows 41 and 42.

Figure 13:
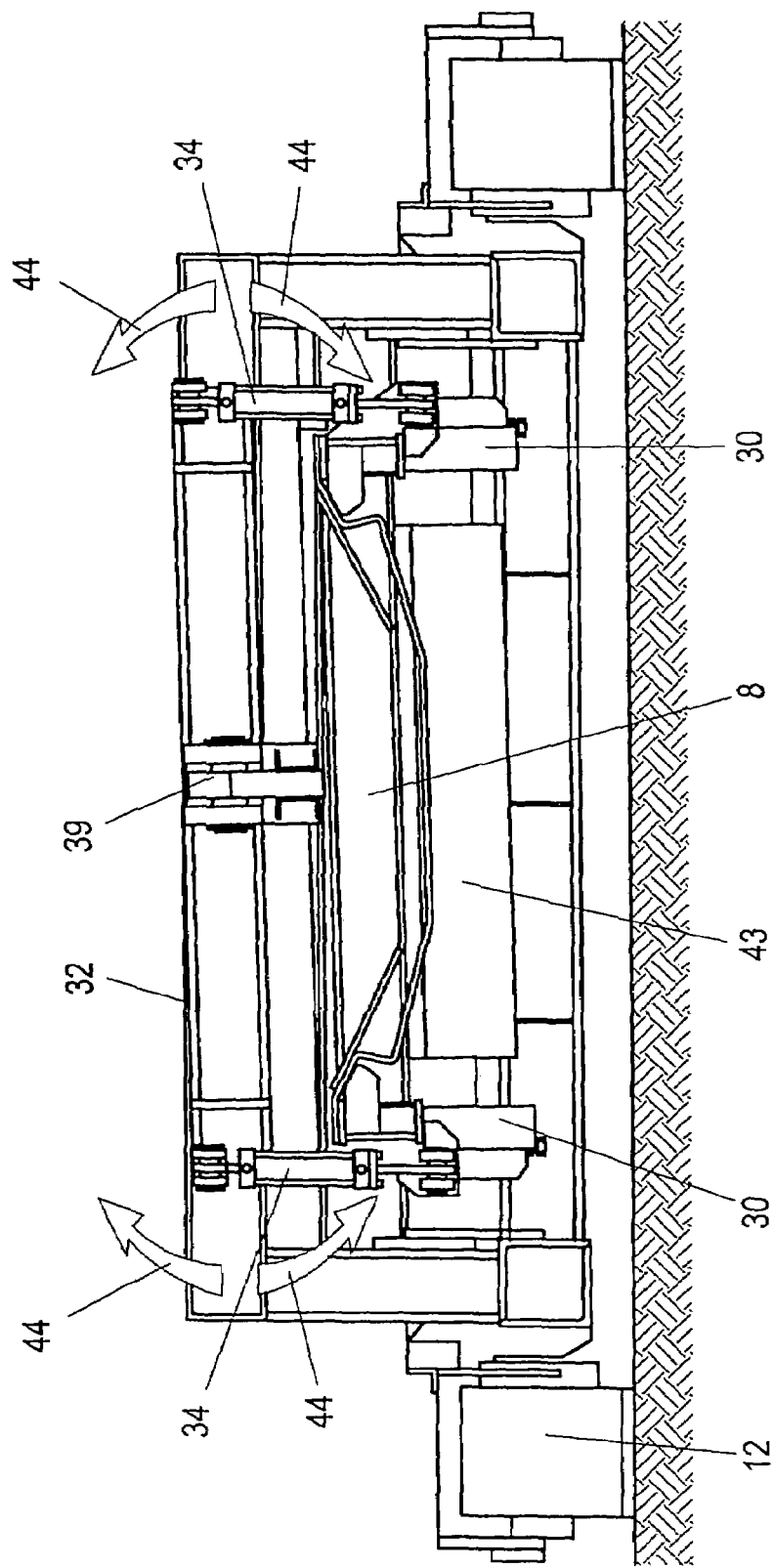
FIG. 13 is a partially sectioned view of the takeover car in the direction of its longitudinal axis.

FIG. 13 depicts the deflection pulley 43 for the conveyor belt, with the lifting cylinders 34 ensuring the lifting and lowering of the frame beams 30, and hence of the subframe formed by the frame beams 30, relative to the portal frame 32. The articulation 39 providing the articulated connection between the subframe and the portal frame in this case allows for the additional degrees of freedom schematically elucidated by double arrows 44.

From FIG. 13, also part of the takeup chute 8 is again apparent from the respective, partially sectional illustration. The support structures 29 illustrated in FIG. 14 on an enlarged scale can be lined up and stored on the frame beams 30 via rollers so as to be removable from these frame beams 30 for an extension of the conveyor belt. A conveyor belt guide is, by the way, apparent from FIG. 12 at 45.

Figure 14:
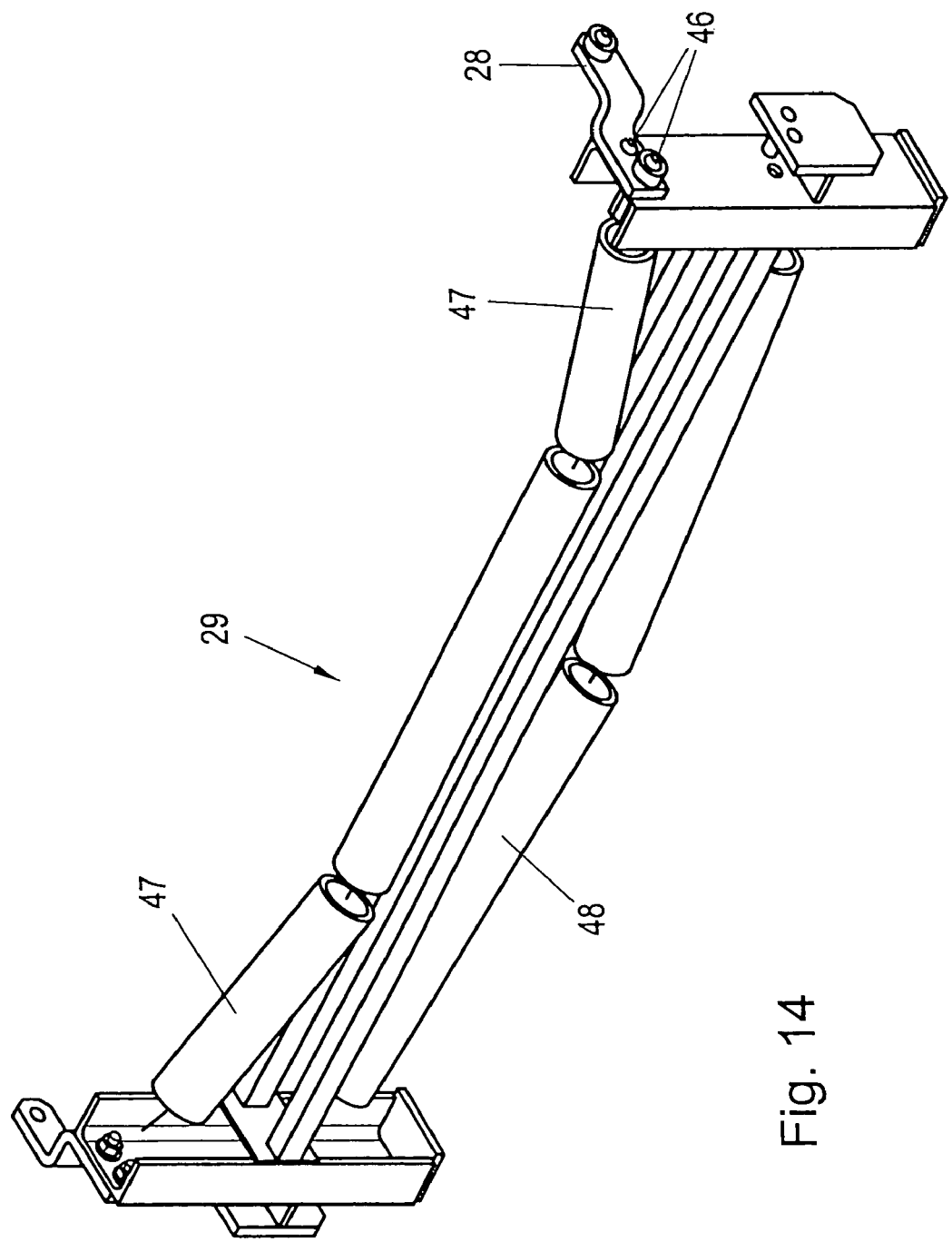
FIG. 14 is an enlarged illustration of a support structure.

As is apparent from FIG. 14, the support structures 29 are connected with the ends of the connection rods 28 via two adjacent locking sites 46 each in a manner as to prevent tilting of the lateral posts of the support structures 29 without requiring large bottom plates. The conveyor belt in this case is conveyed via accordingly arranged support rollers 47, with the return side of the conveyor belt being supported by support rollers 48.

The invention claimed is:

1. A movable conveyor belt storage installation comprising
   a belt storage means,
   conveyor belt support structures following the belt storage means, and
   a movable takeover car comprising a deflection means for a conveyor belt and a takeup chute for taking over excavated material, wherein
   the belt storage means is comprised of at least two segments which are connected with one another so as to be pivotable about an axis extending transversely to a conveyor belt running direction and passing through a plane of a floor, and at least one drum holding additional conveyor belt in a coiled state, and
   at least a portion of the support structures are adaptable to being carried along in or on the takeover car.

2. A movable conveyor belt storage installation according to claim 1, wherein
   a portion of the support structures are mounted so as to be extractable along with the belt storage means, and
   a major portion of the support structures are mounted in the takeover car so as to be liftable and lowerable in a height direction relative to the floor.

3. A takeover car for an installation according to claim 1, comprising
   a frame and a chassis connected with the frame, and
   a deflection pulley for a conveyor belt running below a takeup chute, wherein
   the frame is configured as a portal frame to articulately support at least one subframe for holding at least one of the support structures, a bearing of the deflection pulley, and the takeup chute.

4. A takeover car according to claim 3, wherein the subframe is suspendedly mounted on the portal frame.

5. A takeover car according to claim 4, wherein the subframe is connected with the portal frame so as to be adjustable in a height direction relative to the portal frame.

6. A takeover car according to claim 3, wherein the subframe is connected with the portal frame so as to be adjustable in a height direction relative to the portal frame.

7. A takeover car according to claim 3, wherein the subframe comprises beams extending in a longitudinal direction of the takeover car for accommodating the support structures.

8. A takeover car according to claim 3, wherein the support structures are mounted on the subframe via rollers so as to be displaceable in a longitudinal direction of the takeover car or in a conveying direction.

9. A takeover car for an installation according to claim 1, comprising
   a frame and a chassis connected with the frame, and
   a deflection pulley for a conveyor belt running below a takeup chute, wherein
   the frame is configured as a portal frame to articulately support at least one subframe for holding at least one of the support structures, a bearing of the deflection pulley, and the takeup chute.

10. A belt storage means for a movable conveyor belt storage installation comprising
    a belt storage means,
    conveyor belt support structures following the belt storage means, and
    a movable takeover car comprising a deflection means for a conveyor belt and a takeup chute for taking over excavated material, wherein
    the belt storage means is comprised of at least two segments which are connected with one another so as to be pivotable about an axis extending transversely to a conveyor belt running direction and passing through a plane of a floor, and
    at least a portion of the support structures are adaptable to being carried along in or on the takeover car,
    the, belt storage means comprises a plurality of segments,
    at least two segments are provided with crawler mechanisms,
    the segments comprise frame beams extending transversely to the conveyor belt running direction, and
    releasable locking members are provided for the pivotable connection of frame beams.

11. A belt storage means according to claim 10, wherein the releasable locking members are comprised of pins or rods which are displaceable in an axial direction in a manner as to axially immerse into, or emerge from, bearing eyes mounted on bearing eye-carrying beams of a neighboring segment.

12. A belt storage means according to claim 11, wherein at least one segment comprises bearings for mounting reels carrying additional conveyor belt.

13. A belt storage means according to claim 10, wherein at least one segment comprises bearings for mounting reels carrying additional conveyor belt.

14. A belt storage means according to claim 10, wherein
    the segments, in a box-shaped profile, each comprise traveling rails for cars having displaceable deflection pulleys for stored conveyor belt, and wherein
    the traveling rails enter into mutual alignment upon locking of the locking members.

15. A belt storage means according to claim 10, wherein at least three segments are each equipped with at least one crawler mechanism.

16. A belt storage means according to claim 10, wherein
    the segments each comprise two independently operable locking members arranged outside a longitudinal center of the belt storage means or respective segment, and
    the segments are each connected with one another so as to be pivotable about a locked axis.

17. A belt storage means according to claim 10, wherein the locking members are hydraulically actuatable pins.

18. A takeover car for a movable conveyor belt storage installation comprising a belt storage means, conveyor belt support structures following the belt storage means and a movable takeover car comprising a deflection means for a conveyor belt and a takeup chute for taking over excavated material,
wherein
the belt storage means is comprised of at least two segments which are connected with one another so as to be pivotable about an axis extending transversely to a conveyor belt running direction and passing through a plane of a floor, and
at least a portion of the support structures are adaptable to being carried along in or on the takeover car, and
said takeover car comprises a frame and a chassis connected with the frame, and a deflection pulley for a conveyor belt running below a takeup chute wherein
the frame is configured as a portal frame to articulately support at least one subframe for holding at least one of the support structures, a bearing of the deflection pulley, and the takeup chute, and
the subframe is connected with the portal frame via at least two hydraulic cylinder piston units and at least one further articulation having at least two degrees of freedom of movement.

19. A takeover car for a movable conveyor belt storage installation comprising a belt storage means, conveyor belt support structures following the belt storage means and a movable takeover car comprising a deflection means for a conveyor belt and a takeup chute for taking over excavated material,
wherein
the belt storage means is comprised of at least two segments which are connected with one another so as to be pivotable about an axis extending transversely to a conveyor belt running direction and passing through a plane of a floor, and
at least a portion of the support structures are adaptable to being carried along in or on the takeover car, and
said takeover car comprises a frame and a chassis connected with the frame, and a deflection pulley for a conveyor belt running below a takeup chute, wherein
the frame is configured as a portal frame to articulately support at least one subframe for holding at least one of the support structures, a bearing of the deflection pulley, and the takeup chute,
a deposit for connection rods for the support structures is provided on the takeover car, and wherein
the connection rods are connectable with two locking sites of the support structures via at least two screw bolts, which are offset in a longitudinal direction over the connection rods.

20. A belt storage means for a movable conveyor belt storage installation comprising a belt storage means, conveyor belt support Structures following the belt storage means and a movable takeover car comprising a deflection means for a conveyor belt and a takeup chute for taking over excavated material, wherein
the belt storage means is comprised of at least two segments which are connected with one another so as to be pivotable about an axis extending transversely to a conveyor belt running direction and passing through a plane of a floor,
at least a portion of the support structures are adaptable to being carried along in or on the takeover car,
a portion of the support structures are mounted so as to be extractable alone with the belt storage means,
a major portion of the support structures are mounted in the takeover car so as to be liftable and lowerable in a height direction relative to the floor,
the belt storage means comprises a plurality of segments,
at least two segments are provided with crawler mechanisms,
the segments comprise frame beams extending transversely to the conveyor belt running direction, and
releasable locking members are provided for the pivotable connection of frame beams.

* * * * *